United States Patent
Sun et al.

(10) Patent No.: US 8,472,349 B1
(45) Date of Patent: Jun. 25, 2013

(54) DETERMINING MEAN OPINION SCORES (MOS) FOR VARIABLE BIT RATE AUDIO STREAMS

(75) Inventors: Quenie Qinghua Sun, Allen, TX (US); John Peter Curtin, Richardson, TX (US)

(73) Assignee: Tektronix, Inc., Plano, TX (US)

( * ) Notice: Subject to any disclaimer, the term of this patent is extended or adjusted under 35 U.S.C. 154(b) by 84 days.

(21) Appl. No.: 13/327,667

(22) Filed: Dec. 15, 2011

(51) Int. Cl.
 *H04L 12/28* (2006.01)
(52) U.S. Cl.
 USPC .......................................... 370/254; 370/401
(58) Field of Classification Search
 USPC .................. 370/252, 254, 255, 352–356, 401
 See application file for complete search history.

(56) References Cited

U.S. PATENT DOCUMENTS

| | | | | |
|---|---|---|---|---|
| 5,850,388 | A * | 12/1998 | Anderson et al. | 370/252 |
| 6,600,720 | B1 * | 7/2003 | Gvozdanovic | 370/230 |
| 7,974,214 | B2 * | 7/2011 | Han et al. | 370/252 |
| 7,983,160 | B2 * | 7/2011 | Gunatilake | 370/230.1 |

* cited by examiner

*Primary Examiner* — Hong Cho
(74) *Attorney, Agent, or Firm* — Edwards Wildman Palmer LLP; Scott D. Wofsy; Christopher J. Capelli

(57) ABSTRACT

Systems and methods for determining mean opinion scores (MOS) for variable bit rate (VBR) audio streams transmitted over VoIP networks are described. In an embodiment, a method may include monitoring a communication over a network and detecting portions of the communication including packets having a different packet payload sizes. The method may also include deriving bit rates corresponding to those portions. The method may then include calculating MOS values for each portion based on the derived bit rates, and calculating an overall MOS value for the communication based upon each individual MOS value averaged according to a distribution of packets having the different packet payload sizes.

20 Claims, 3 Drawing Sheets

DETERMINING MEAN OPINION SCORES (MOS) FOR VARIABLE BIT RATE AUDIO STREAMS

TECHNICAL FIELD

This specification is directed, in general, to network monitoring, and, more particularly, to systems and methods for determining mean opinion scores (MOS) for variable bit rate (VBR) audio streams transmitted over VoIP networks.

BACKGROUND

Mobile data networks continue to experience an unprecedented expansion in total traffic, as new types of client devices (e.g., web-enabled smart phones, tablet devices, Internet-enabled TVs, gaming consoles, etc.) begin to consume larger amounts of bandwidth. Generally, a coder-decoder ("codec") device or program may be used to transmit certain types of data over a network, such as, for example a voice-over-IP (VoIP) network or the like. In operation, a first instance of an audio codec may encode an audio data stream or signal on the transmitter side of a communication, and a second instance of the audio codec may decode the audio stream on the receiver side of that communication.

Modern mobile networks typically employ variable bit rate (VBR) codecs. The main advantage of VBR codecs is that available bits may be used with flexibility, so that encoding of audio can be dynamically adjusted to fit network bandwidth conditions and/or the complexity of the underlying audio signal. In contrast with constant bitrate (CBR) codecs, VBR codecs can vary the amount of output data (i.e., the number of bits) as a function of time. For example, VBR codecs allow more data to be allocated to more complex segments of an audio signal, while less data is allocated to less complex segments. Additionally or alternatively, bitrates may be adjusted depending upon network traffic or available bandwidth.

SUMMARY

Embodiments of systems and methods for determining mean opinion scores (MOS) for variable bit rate (VBR) audio streams transmitted over VoIP networks are described herein. In an illustrative, non-limiting embodiment, a method may include monitoring a communication over a network and detecting: (i) a first portion of the communication including packets having a first packet payload size, and (ii) a second portion of the communication including packets having a second packet payload size, the second packet payload size different from the first packet payload size. The method may also include deriving: (i) a first bit rate corresponding to the first portion of the communication based, at least in part, upon the first packet payload size, and (ii) a second bit rate corresponding to the second portion of the communication based, at least in part, upon the second packet payload size. The method may further include calculating (i) a first Mean Opinion Score (MOS) for the first portion of the communication based, at least in part, upon the first bit rate, and (ii) a second MOS for the second portion of the communication based, at least in part, on the second bit rate. Then, the method may include generating an overall MOS for the communication based, at least in part, upon (i) the first and second MOS, and (ii) a distribution of the packets having the first and second packet payload sizes.

In some implementations, the communication may include a Real-time Transport Protocol (RTP) audio stream. Also, the network may include a mobile network, a Voice-over-IP (VoIP) network, or the like. Moreover, in some cases, the communication may be encoded with an Adaptive Multi-Rate (AMR) codec or an Enhanced Variable Rate codec (EVRC).

Generally speaking, the first MOS may provide a first numerical indication of a first perceived quality of the first portion of the communication from a receiver's perspective, and the second MOS provides a second numerical indication of a second perceived quality of the second portion of the communication from the receiver's perspective. Furthermore, generating the overall MOS may include calculating a weighted average of the first and second MOS based on a first weigh proportional to an amount of packets having the first packet payload size and on a second weigh proportional to an amount of packets having the second packet payload size, respectively.

The method may also include detecting a third portion of the communication having a third packet payload size, the third packet payload size different from the first and second packet payload sizes, deriving a third bit rate corresponding to the third portion of the communication based, at least in part, upon the third payload size, calculating a third MOS for the third portion of the communication based, at least in part, on the third bit rate, and generating the overall MOS for the communication based, at least in part, upon (i) the first, second, and third MOS, and (ii) a distribution of the monitored packets having the first, second, and third packet payload sizes In another illustrative, non-limiting embodiment, a method may include receiving an audio signal in an RTP stream over a VoIP network, the audio signal encoded using a VBR codec, determining that a first portion of the RTP stream corresponding to a first portion of the audio signal is transmitted with a first bit rate, and calculating a first MOS for the first portion of the audio signal based, at least in part, upon the first bit rate. The method may also include determining that a second portion of the RTP stream corresponding to a second portion of the audio signal is transmitted with a second bit rate, where the second bit rate is different from the first bit rate, calculating a second MOS for the second portion of the audio signal based, at least in part, upon the second bit rate, and generating an average MOS for the audio signal based, at least in part, upon the first and second MOS.

To determine that the first portion of the RTP stream corresponding to the first portion of the audio signal is transmitted with the first bit rate, the method may include determining a packet-time used by the VBR codec in the first portion of the RTP stream, determining a payload size of a packet in the first portion of the RTP stream, and calculating a bit rate for the RTP stream based, at least in part, upon the packet-time and the payload size.

In some implementations, the method may include using the calculated bit rate as the first bit rate for the first portion of the RTP stream. In other implementations, the method may include selecting the first bit rate as being a bit rate value prescribed by the VBR codec that is closest to the calculated bit rate. In some cases, to select the first bit rate, method may include adding or subtracting a bit rate deviation value to or from the calculated bit rate. For example, the bit rate deviation value may correspond to a number of bits in a padded portion of the packet's payload.

To generate the average MOS, the method may include calculating a packet payload size distribution corresponding to the first and second portions of the RTP stream. The method may also include calculating a weighted average of the first and second MOS using the packet payload size distribution.

In yet another illustrative, non-limiting embodiment, a method may include calculating a packet payload size distribution for an audio stream encoded with different bit rates, and calculating MOS for each of two or more portions of the packet payload size distribution based, at least in part, upon the different bit rates. The method may also include determining an overall MOS for the audio stream based, at least in part, upon the calculated MOS and packet payload size distribution. For example, the audio signal may be transmitted in an RTP stream over a VoIP network, and it may be encoded using an AMR or EVRC codec. In some implementations, the method may further include flagging the audio stream in response to the overall MOS meeting a threshold value.

In some embodiments, one or more of the methods described herein may be performed by one or more computer systems. In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, wherein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
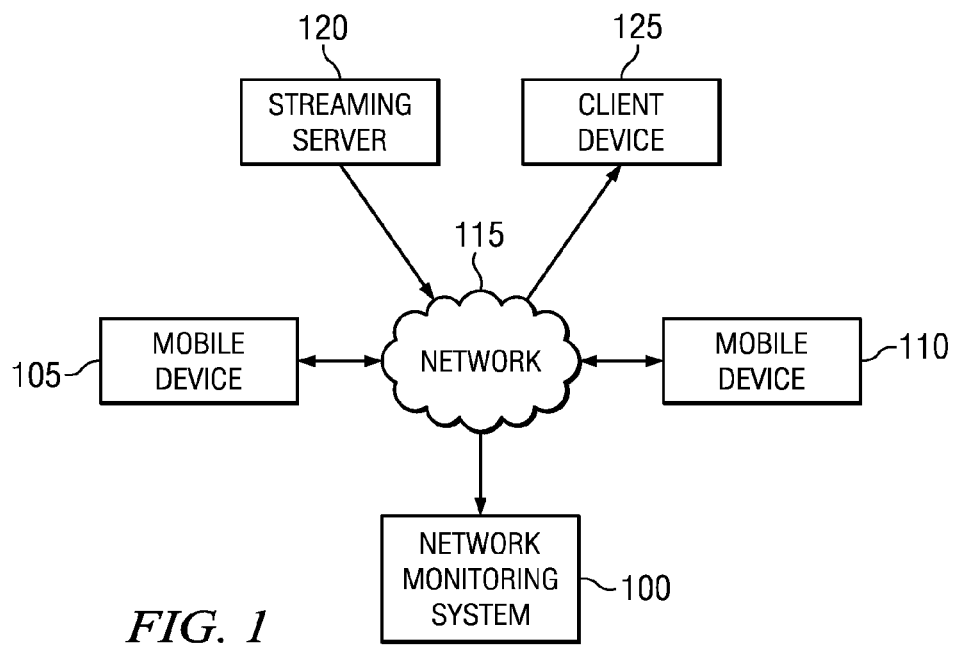
FIG. 1 is a block diagram of a network monitoring system according to some embodiments.

Turning to FIG. 1, a block diagram of a network monitoring system is shown according to some embodiments. As illustrated, mobile devices 105 and 110 may be capable of transmitting and receiving data streams (e.g., audio, video, etc.) to and from each other over network 115. Also, streaming server 120 may be configured to provide one or more data streams to client device 125 through network 115. Communications between mobile devices 105 and 110, as well as communications between server 120 and client device 125, may be monitored by network monitoring system 100, as data packets comprising those communications pass through network 115. Protocols used to enable communications taking place in FIG. 1 may be selected, for instance, based upon the type of content being communicated, the type of network 115, and/or the capabilities of devices 105, 110, and/or 125. Examples of types of protocols that may be used include, but are not limited to, HyperText Transfer Protocol (HTTP), Real Time Messaging Protocol (RTMP), and Real-time Transport Protocol (RTP). Moreover, the underlying data within a given data stream may be encoded using any suitable of constant or variable bit rate (VBR) codecs including, but not limited to, an Adaptive Multi-Rate (AMR) codec, an Enhanced Variable Rate codec (EVRC), or variations thereof.

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track the same set of user experience information for each session and each client without regard to the protocol (e.g. HTTP, RTMP, RTP, etc.) used to support the session. For example, by identifying the encoding method and the bitrate distribution used in a given session, monitoring system 108 may be capable of identifying certain information about each user's experience, as described in more detail below. A service provider may use this information, for instance, to adjust the network services available to client devices 105, 110, and/or 125 such as the bandwidth assigned to each user, and the routing of data packets through network 115.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by streaming server 125 through a stand-alone or web-based client application. Streaming server 120 may include any server or computer system capable of delivering content to device 125. Network 115 may include any suitable wired or wireless/mobile computer or data network including, for example, the Internet, or third generation (3G), fourth generation (4G), or Long Term Evolution (LTE) wireless networks. In some embodiments, network 115 may implement a Voice-over-IP (VoIP) network or the like. Network monitoring system 100 may include a network monitor or analyzer, a packet sniffer, a probe, or the like, coupled to network 115.

Figure 2:
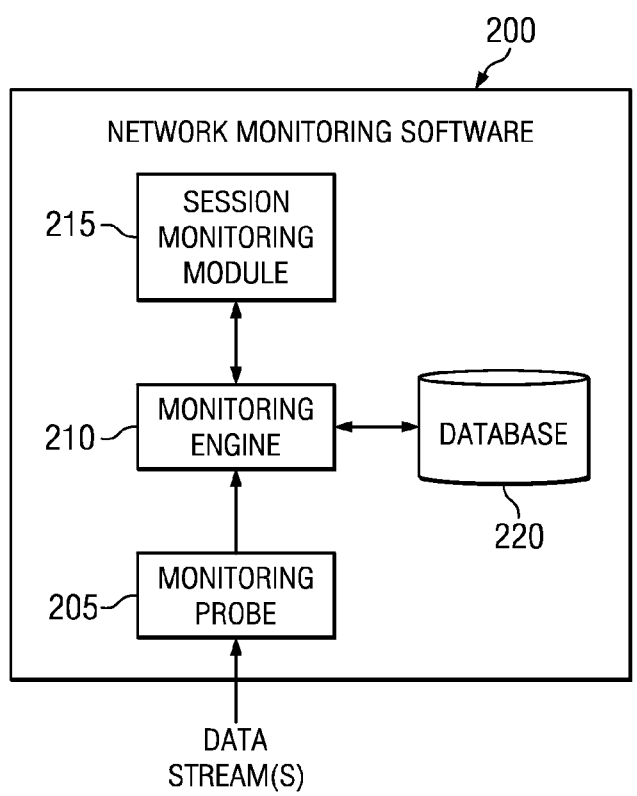
FIG. 2 is a block diagram of a network monitoring software program according to some embodiments.

FIG. 2 is a block diagram of a network monitoring software program. In some embodiments, network monitoring software 200 may be a software application executable by one or more processors within monitoring system 100 of FIG. 1. As previously noted, a plurality of communication sessions or data streams may be transmitted across network 115 between devices 105, 110, 120, and/or 125. Such communications may be streamed over HTTP, RTMP, RTP, or other suitable protocols. In the case of VoIP communications, the protocol used for each VoIP session may be dependent, for example, upon the source of the underlying audio signal. For instance, different devices may use different protocols. The bitrate used for each VoIP session may be dependent upon the network 115 bandwidth assigned to the session or the client. The bandwidth may vary on a session-by-session basis and/or may vary during individual VoIP sessions. The capabilities of devices 105, 110, 120, and/or 125 may also affect the bitrate used for individual VoIP sessions.

Monitoring probe 205 may be configured to capture data packets from network 115, including data from one or more VoIP sessions. As such, monitoring probe 205 may determine identifying information for the captured data packets and combines related data into session records. Monitoring probe 205 may then feed session records and captured packet data to monitoring engine 210. In some cases, a session record may include multiple segments that are provided to monitoring engine 210 periodically while an associated VoIP session is active. Monitoring engine 210 may in turn be configured to extract session data from each session record and to identify the protocol and/or codec used for each session record.

The session data may be provided as a monitoring feed to session monitoring module 215 and/or is stored to database 220. Database 220 may also store subscriber information and client device data.

Network monitoring software 200 may allow the service provider for network 115 to collect data from various VoIP sessions concurrently or simultaneously. Network monitoring software 200 may also determine the protocol used for a VoIP session and then extract session data and parameters. Data for multiple sessions is stored in database 220, which allows the service provider to track each session or to extract system-wide parameters. For example, monitoring probe 205 and/or monitoring engine 210 may identity the type of protocol being used for each session by analyzing the header of one or more data packets for that session. Generally speaking, data packets for a given session may correspond to a small fragment of a VoIP stream being transmitted to the client device.

Monitoring probe 205 and/or monitoring engine 210 may also track the bandwidth available to each VoIP session, and may identify bandwidth changes that occur in real-time. Moreover, monitoring probe 205 and/or monitoring engine 210 may detect when gaps or missing fragments occur in the stream of data packets for any of the sessions. The session parameters, bandwidth information, and gap data may be collected to database 200 and/or presented to the service provider.

Data stored in database 220 may be queried by the service provider, for example, on a per-session, per-user, per-device, or per-protocol basis. Session monitoring module 210 may use the collected information to generate Quality-of-Experience (QoE) and Key-Quality-Indicators (KQIs) for each session and for the overall network. The QoE and KQIs may be based, for example, on how often re-buffering, screen resolution changes, gaps, and/or missing fragments are detected. Excessive buffering during the session (i.e. re-buffering), numerous screen resolution changes, and gaps in the VoIP stream may lower a user's QoE.

In addition, monitoring engine 210 and/or session monitoring module 215 may be configured to calculate an average or overall Mean Opinion Score (MOS) for a given VoIP stream, as described below with respect to FIG. 4. Generally speaking, a MOS value may provide a numerical indication (e.g., 1 to 5) of the perceived quality of a communication from a receiver's perspective (after having been transmitted and compressed using codecs).

Figure 3:
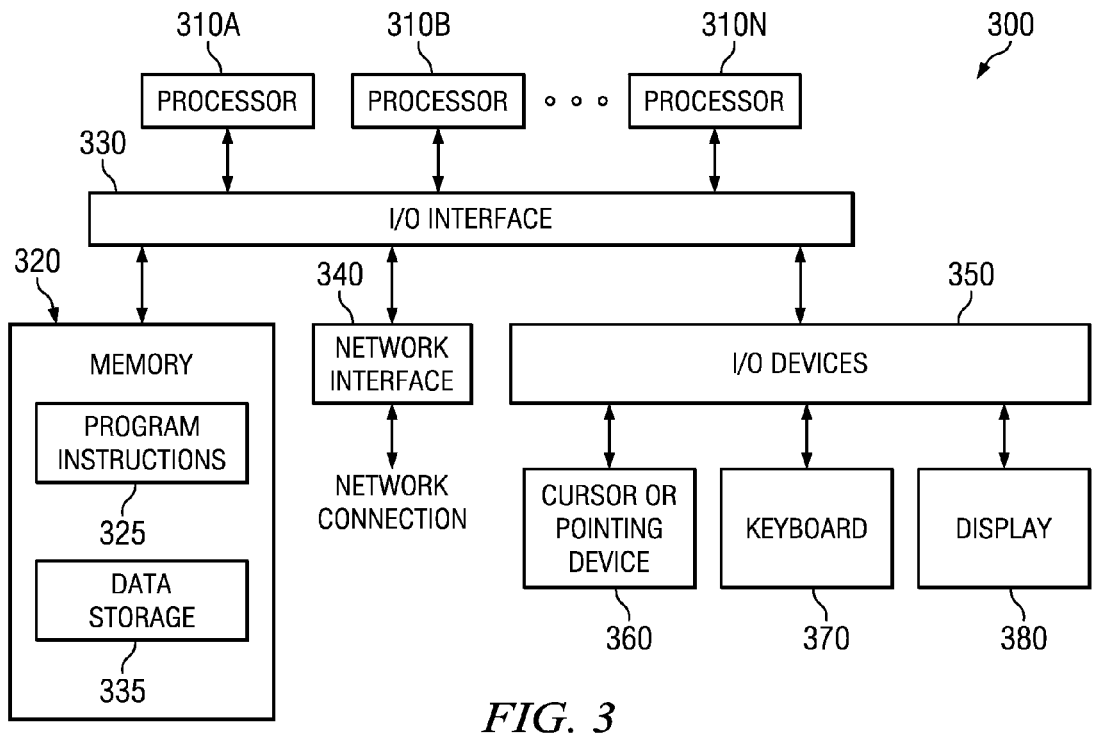
FIG. 3 is a block diagram of a computer system configured to implement various systems and methods described herein according to some embodiments.

Embodiments of network monitoring system 100 may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, network monitoring system 100 shown in FIG. 1 may be implemented as computer system 300. Moreover, one or more of streaming server 120 or devices 105, 110, and 125 may include one or more computers in the form of computer system 300. As explained above, in different embodiments these various computer systems may be configured to communicate with each other in any suitable way, such as, for example, via network 115.

As illustrated, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In some embodiments, a given entity (e.g., network monitoring system 110) may be implemented using a single instance of computer system 300, while in other embodiments multiple such systems, or multiple nodes making up computer system 300, may be configured to host different portions or instances of embodiments. For example, in an embodiment some elements may be implemented via one or more nodes of computer system 300 that are distinct from those nodes implementing other elements (e.g., a first computer system may implement monitoring probe 205 while another computer system may implement monitoring engine 210).

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 4-6, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-accessible medium may include any tangible storage media or memory media such as magnetic or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to network 115, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touch screens, scanning devices, voice or optical recognition devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data accessible by program instructions 325. In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Figure 4:
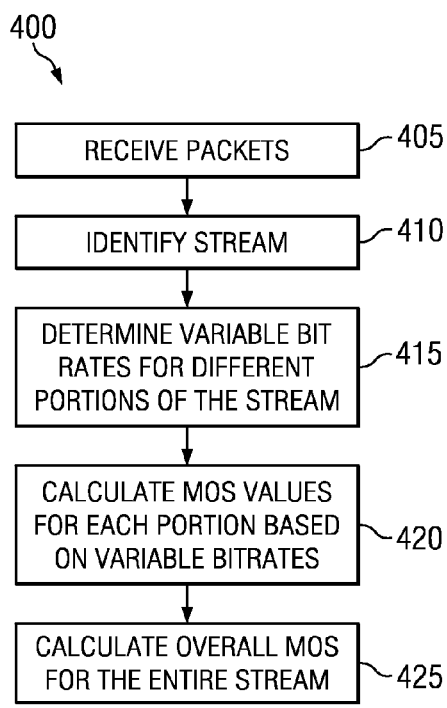
FIG. 4 is a flowchart of a method of calculating an overall MOS value for a data stream transmitted over a network according to some embodiments.

Turning to FIG. 4, a flowchart of a method of calculating an overall MOS value for a data stream transmitted over a network is shown. In some embodiments, method 400 may be executed, for example, by network monitoring system 100 of FIG. 1. At block 405, network monitoring system 100 may receive data packets. At block 410, network monitoring system 100 may parse and/or identify different streams, for example, by inspecting one or more packets and obtaining stream-identifying information from their headers. At block 415, network monitoring system 100 may determine and/or identify variable or different bit rates for each different portion of each stream. (Examples of methods for calculating bit rates are described in connection with FIGS. 5 and 6 below.) At block 420, network monitoring system 100 may calculate MOS values for each portion of each stream. For example, each MOS value may be calculated based on a bitrate of a respective portion of a given stream.

As noted above, MOS is typically expressed as a number, from 1 to 5—with 1 being the worst and 5 the best. Although MOS is a subjective value (as perceived by people during tests), it may also be calculated or measured by a computer. For sake of explanation, the MOS scale is usually such that a "5" score represents a perfect, face-to-face conversation ("Excellent"). A "4" score represents a good communication, where although imperfections may be perceived, the sound is still clear ("Good"). Scores "3" and "2" represent annoying and very annoying conversations ("Fair" and "Poor," respectively), and a "1" score represents an inability to carry on a conversation ("Bad").

In some embodiments, MOS values need not be whole numbers. For example, a value of 4.0 to 4.5 is referred to as toll-quality, and considered as providing complete user satisfaction. In fact, at the present time, this is the normal value of PSTN and many VoIP services. Conversely, MOS values that drop below 3.5 are deemed unacceptable by many users. Moreover, in different scenarios, different types of MOS scores may be used, for example, as provided in ITU-T P.800 (e.g., MOS-LQS, MOS-LQD, MOS-LQE, MOS-CQS, MOS-CQO, MOS-CQE, etc.)

In some embodiments, the "E-Model" (ITU-T G.107) may be used to calculate MOS values (e.g., in block 420 above). The E-Model takes into account a wide range of impairments, including impairments due to low bitrate encoding devices, one-way transmission delay, packet loss, noise, and echo. Specifically, the E-Model is based on the following equation:

$$MOS = 1 + (0.035 \times R) + R \times (R-60) \times (100-R) \times 7e^{-6}$$

where the "rating factor" R=Ro−Is −Id−Ie,eff+A. In this equation, Ro represents the signal-to-noise ratio, including noise sources such as circuit noise and room noise. Factor Is represents a combination of all impairments which occur more or less simultaneously with the voice signal, whereas factor Id represents the impairments caused by delay. The effective equipment impairment factor Ie-eff represents impairments caused by low bit-rate codecs. The latter factor also includes impairment due to packet-losses of random distribution. Meanwhile, advantage factor A allows for compensation of impairment factors when there are other advantages of access to the user.

Moreover, Ie,eff may be calculated as follows:

$$Ie,eff=Ie+(95-Ie)\times(Ppl/(Ppl+Bpl))$$

Where Ie is the Baseline Equipment Impairment Factor, Ppl is the Probability of Packet Loss, and Bpl is the Packet-loss Robustness Factor. Of these variables, Ppl is independent from bitrate; however, both Ie and Bpl are a function of the bitrate. Importantly, the bitrate used by VBR codecs can change during a conversation. Since Ie and Bpl vary based on bit rate, MOS calculation for VBR codecs may take the dynamic bit rate changes into consideration. The foregoing operations may thus involve detecting the different bit rates used in a same conversation of data stream (e.g., at block 415 above), and calculating MOS values for each bit rate (e.g., at block 420).

Then, at block 425, network monitoring system 100 may calculate an average or overall MOS value for an entire stream based on the individual MOS values for each portion of the stream encoded with a different bit rate. For example, in the event that the bit rate changes during a voice call, a different MOS may be calculated for each bit rate using the appropriate Ie and bpl (e.g., at block 420), and those values may then be averaged at block 425 to generate an overall MOS for the entire conversation, for example, based on the bit rate distribution of that conversation.

As noted in block 415 above, network monitoring system 100 may determine, detect or calculate bit rate changes in the data stream or communication. In some embodiments, network monitoring system 100 may detect bit rate changes through control signaling (e.g., information contained in the packet header). It should be noted, however, that bit rate changes do not always get negotiated in control plane since the rate change may be communicated within the media stream itself. Also, the inventors hereof have recognized that associating control signaling with media session in real time is computationally expensive, and the delay in processing this information may not always be acceptable. Furthermore, in some cases, control signaling may simply not be part of the media monitoring solution.

Figure 5:
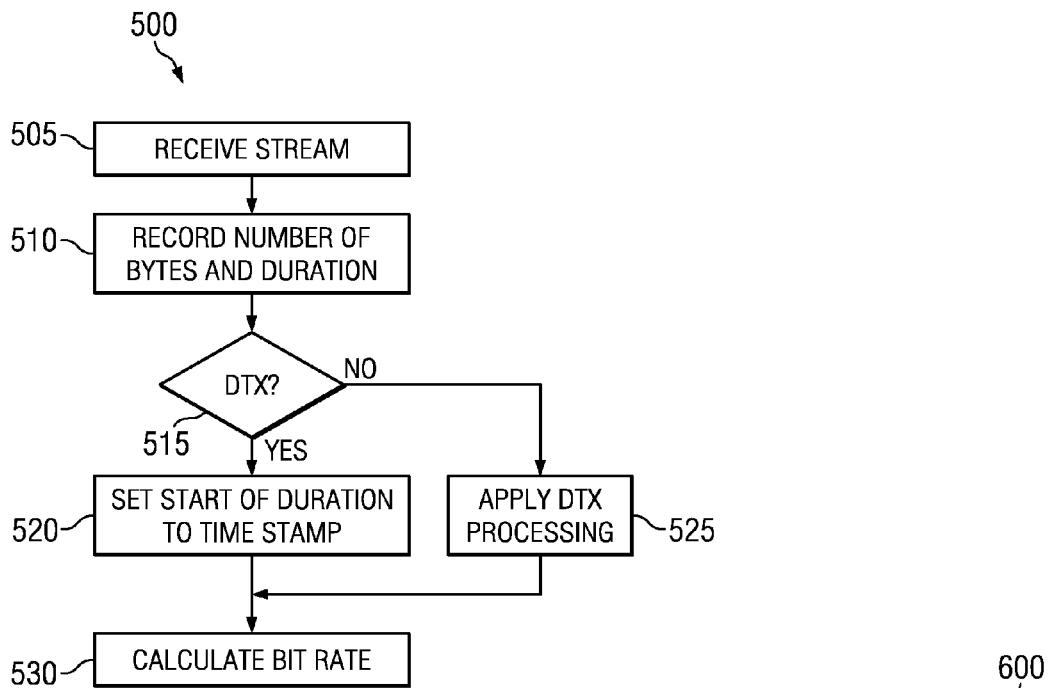
FIG. 5 is a flowchart of a method of calculating the bit rate of a data stream according to some embodiments.

Accordingly, in an alternative embodiment, network monitoring system 100 may detect bit rate changes by periodically calculating an average bit rate based on the number of bits received and their duration. This approach is based in part on the observation that, because the bit rate is the number of bits sent every second, it is possible to compute such bit rates based on the number of data (e.g., audio) payload bits received within a certain period of time. The number of payload bits may exclude those re-transmitted packets and account for the lost packets. Additionally, Discontinuous Transmission (DTX) or silence suppression packets may not be counted for purposes of bit rate calculations. FIG. 5 is a flowchart of a method of calculating the bit rate of a data stream according to such an embodiment. In some implementations, method 500 may be executed, for example, by network monitoring system 100 of FIG. 1.

At block 505, network monitoring system 100 may receive a data or audio stream. For example, network monitoring system 100 may receive a file that contains RTP packets. In some cases, such a file may contain multiple streams. Accordingly, the RTP packets may be classified into individual streams, for example, based on synchronization source (SSRC) information. At block 510, for a given stream, network monitoring system 100 may keep track of the number of bytes received and the aggregated duration in which unique, contiguous, non-silent RTP packets are received. At block 515, network monitoring system 100 may determine whether the packet is a DTX packet. If so, network monitoring system 100 may set the start of the duration to the time stamp of the packet at block 520. Otherwise, network monitoring system 100 may apply DTX processing at block 525.

For example, if the previous packet is a DTX packet, network monitoring system 100 may add 20 milliseconds to the packet's duration, and add payload bytes to the total number of bytes. Then, if the sequence number representing the order of the packet among other packets in the same stream did not change or decrease (i.e., indicative of a re-transmission), the DTX processing may end. (It should be noted that, since the sequence number can decrease due to wrap, for example, we may heuristically determine if it is truly a sequence number retreat.) If the sequence number increased by 1, network monitoring system 100 may add the delta between the two packets to the packet's duration, and add payload bytes to the total number of bytes. Moreover, if the sequence number increased by more than 1 (packet loss), network monitoring system 100 may handle it the same way as if this packet had been received after a silence (or DTX) packet.

At block 530, network monitoring system 100 may calculate and record the bit rate by dividing the total number of bytes by their effective duration. In some cases, these calculations may be performed periodically (e.g., every 5 seconds or another suitable time interval), and then used to generate a bit rate distribution for the received data stream.

Although appropriate in some cases, the inventors hereof have recognized that in other cases the method of FIG. 5 may yield non-ideal results. For example, when bit rate changes frequently, the calculated bit rate is the average bit rate for the chosen calculating duration. Bit rate changes within the calculating duration may not be detected, and certain codecs (e.g., EVRC) allow bit rates to change at the millisecond scale. Also, when the sequence number retreats, the effective duration is prolonged, and the calculated bit rate is lower than expected. Furthermore, for AMR (Adaptive Multiple Rate) codec, the bit rate difference between different modes can be as small as 0.4 kbits/s, and it is possible that the "actual" bit rate cannot be determined because the calculated average bit rate is right in between two modes.

Figure 6:
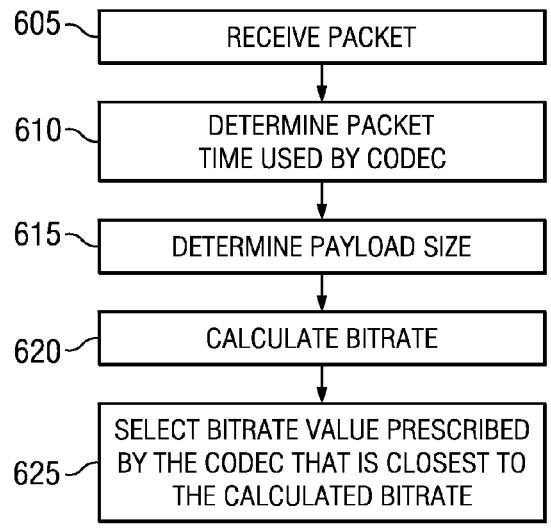
FIG. 6 is a flowchart of another method of calculating the bit rate of a data stream according to some embodiments.

Accordingly, in yet another alternative embodiment, network monitoring system 100 may detect bit rate changes by using an RTP payload size distribution to reflect the codec bit rate distribution. In other words, instead of calculating bit rates (as in FIG. 5), network monitoring system 100 may calculate RTP payload size distribution. FIG. 6 is a flowchart of another method of calculating the bit rate of a data stream according to that embodiment. Again, in some implementations, method 600 may be executed, for example, by network monitoring system 100 of FIG. 1.

At block 605, network monitoring system 100 may receive a packet within an identified audio data stream. At block 610, network monitoring system 100 may determine the packet time employed by the relevant codec. At block 615, network monitoring system 100 may determine the payload size of the packet. As such, for each data stream, network monitoring system 100 may keep a map of the size of the payload and the number of packets of that payload size—i.e., a packet payload size map or distribution. For any non-DTX packets, if the sequence number increased by at least 1, network monitoring system 100 may update the map by increasing the packet count for that payload size.

The payload size distribution may be represented, for example, as a percentage distribution of various payload sizes. Since voice frames are typically sent every 20 milliseconds, the payload size distribution may be identical to the bit rate distribution for a corresponding portion of the communication. Accordingly, at block 620, network monitoring system 100 may calculate a bit rate for that portion. In some cases, at block 625, network monitoring system 100 may, after calculating the bit rate based on the payload size, look up the closest bit rate value prescribed by the underlying codec.

For example, the AMR codec uses the following bitrates (in kbits/s): 12.2, 10.2, 7.95, 7.4, 6.7, 5.9, 5.15, 4.75, and 1.8. Meanwhile, EVRC compresses each 20 milliseconds of 8000 Hz, 16-bit sampled speech input into output frames of one of the following different sizes: full rate=171 bits (8.55 kbit/s), ½ rate=80 bits (4.0 kbits/s), ¼ rate=40 bits (2.0 kbits/s, EVRC-B only), and ⅛ rate=16 bits (0.8 kbit/s, used for silence). Therefore, in some embodiments, at block 625 the bit rate calculated in block 620 may be "quantized" to known bitrates supported by the applicable codec (e.g., a calculated bitrate of 8 kbits/s may be approximated to the 7.95 kbits/s AMC bitrate or the full EVRC rate, depending upon which codec is being used).

Figure 7:
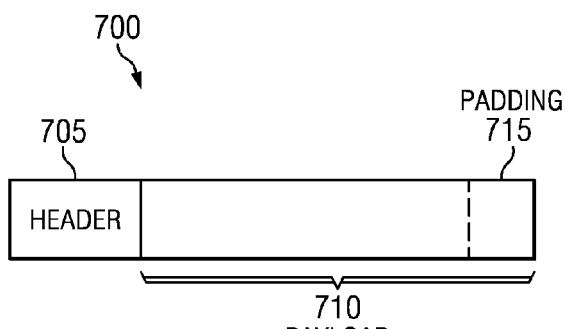
FIG. 7 is a diagram of a packet measured according to some embodiments.

Furthermore, in some cases, in order to find the closest supported bitrate for a given codec, at block 615 network monitoring system 100 may add or subtract a payload deviation value to the determined payload size. To illustrate this technique, FIG. 7 shows a diagram of a packet measured according to some embodiments. Particularly, packet 700 includes header portion 705 and payload portion 710. Payload portion 710 includes padding bits 715 (0-7 bits), typically used to "byte align" packet 700. In this case, the "actual" payload is represented by the difference between payload portion 710 (measured in block 615) and padding bits 715 (of an unknown size). Therefore, in some embodiments, in order to find a codec bitrate, the maximum number of padding bits may be subtracted from the payload size to yield with a lower payload size number, and the lower payload size number along with the measured payload size may together be used to calculate two bitrate values, which may then be used to determine which codec bitrate falls within those two values.

In some cases, the approach described in connection with FIG. 6 may reduce the amount of work required to support variable bit rate codecs. This is due in part to fact that per-packet monitoring software is not required to understand the payload-encoding format of the codec, since it simply maintains a map or distribution of the various payload sizes.

As an example, consider the following payload size distribution calculated for a real-world EVRC RTP stream (for example, as determined in block 615 of FIG. 6): a payload size of 10 bytes (4.0 kbits/s) occurs in 21.141975% of all packets in the stream, and a payload size 22 bytes (8.8 kbits/s) occurs is 78.858025% of all packets in the stream.

Here, EVRC packet time is 20 milliseconds. Therefore payload sizes equal to 10 bytes and 22 bytes directly map to bitrates of 4.0 kbits/s and 8.8 kbits/s, respectively (for example, as determined in block 620 of FIG. 6). Network monitoring system 100 may then calculate the MOS for bit rates 4.0 kbits/s and 8.8 kbits/s separately using Ie and bpi that are appropriate to the bit rate (for example, as in block 420 of FIG. 4). And the overall MOS may then be calculated (e.g., in block 425) using the payload size distribution as weighs for each MOS value as follows:

$$MOS_{OVERALL} = MOS_{4.0} * 21.141975\% + MOS_{8.8} * 78.858025\%$$

The result is a MOS score per bit-rate and a high-quality approximated overall MOS for the entire RTP stream. It should be noted, however, that the foregoing example is provided for sake of explanation only, and that the techniques discussed herein are capable of supporting payload size distributions of any arbitrary complexity, including in cases where bitrates potentially change on a packet-by-packet basis.

In some embodiments, once the overall or averaged MOS is calculated, network monitoring system 100 may be configured to take predetermined action(s). For example, if the overall MOS for a given communication falls below a specified threshold (e.g., 3 or 3.5), network monitoring system 100 may notify the network operator. Also, if the overall MOS is above a given threshold (e.g., 4.5 or 5), network monitoring system 100 may instruct the network operator to reclaim some of the bandwidth initially allocated for the communication. Conversely, if the overall MOS drops below the minimum threshold value, network monitoring system 100 may instruct the network operator to allocate additional bandwidth to the communication. In some embodiments, overall MOS calculations may be performed during the communication (e.g., in real time) for control purposes and/or after termination of the communication for reporting purposes. For instance, in some cases, MOS reports may be aggregated based on source, destination, and/or path to diagnose network problems or the like.

The various techniques described herein may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   performing, by one or more computer systems,
      monitoring a communication over a network;
      detecting (i) a first portion of the communication including packets having a first packet payload size, and (ii) a second portion of the communication including packets having a second packet payload size, the second packet payload size different from the first packet payload size;
      deriving (i) a first bit rate corresponding to the first portion of the communication based, at least in part, upon the first packet payload size, and (ii) a second bit rate corresponding to the second portion of the communication based, at least in part, upon the second packet payload size;
      calculating (i) a first Mean Opinion Score (MOS) for the first portion of the communication based, at least in part, upon the first bit rate, and (ii) a second MOS for the second portion of the communication based, at least in part, on the second bit rate; and
      generating an overall MOS for the communication based, at least in part, upon (i) the first and second MOS, and (ii) a distribution of the packets having the first and second packet payload sizes.

2. The method of claim 1, wherein the communication includes a Real-time Transport Protocol (RTP) audio stream.

3. The method of claim 1, wherein the network includes a Voice-over-IP (VoIP) network.

4. The method of claim 1, wherein the communication is encoded with an Adaptive Multi-Rate (AMR) codec or an Enhanced Variable Rate codec (EVRC).

5. The method of claim 1, wherein the first MOS provides a first numerical indication of a first perceived quality of the first portion of the communication from a receiver's perspective, and wherein the second MOS provides a second numerical indication of a second perceived quality of the second portion of the communication from the receiver's perspective.

6. The method of claim 1, wherein generating the overall MOS includes calculating a weighted average of the first and second MOS based on a first weigh proportional to an amount of packets having the first packet payload size and on a second weigh proportional to an amount of packets having the second packet payload size, respectively.

7. The method of claim 1, further comprising:
performing, by the one or more computer systems,
  detecting a third portion of the communication having a third packet payload size, the third packet payload size different from the first and second packet payload sizes;
  deriving a third bit rate corresponding to the third portion of the communication based, at least in part, upon the third payload size;
  calculating a third MOS for the third portion of the communication based, at least in part, on the third bit rate; and
  generating the overall MOS for the communication based, at least in part, upon (i) the first, second, and third MOS, and (ii) a distribution of the monitored packets having the first, second, and third packet payload sizes.

8. A network monitoring system, comprising:
a processor; and
a memory coupled to the processor, the memory configured to store program instructions executable by the processor to cause the network monitoring system to:
  receive an audio signal in a Real-time Transport Protocol (RTP) stream over a Voice-over-IP (VoIP) network, the audio signal encoded using a Variable Bit Rate (VBR) codec;
  determine that a first portion of the RTP stream corresponding to a first portion of the audio signal is transmitted with a first bit rate;
  calculate a first Mean Opinion Score (MOS) for the first portion of the audio signal based, at least in part, upon the first bit rate;
  determine that a second portion of the RTP stream corresponding to a second portion of the audio signal is transmitted with a second bit rate, the second bit rate different from the first bit rate;
  calculate a second MOS for the second portion of the audio signal based, at least in part, upon the second bit rate; and
  generate an average MOS for the audio signal based, at least in part, upon the first and second MOS.

9. The network monitoring system of claim 8, wherein the VBR codec is selected from the group consisting of: an Adaptive Multi-Rate (AMR) codec and an Enhanced Variable Rate codec (EVRC).

10. The network monitoring system of claim 8, wherein the VoIP network includes a mobile network.

11. The network monitoring system of claim 8, wherein to determine that the first portion of the RTP stream corresponding to the first portion of the audio signal is transmitted with the first bit rate, the program instructions are further executable by the processor to cause the network monitoring system to:
  determine a packet-time used by the VBR codec in the first portion of the RTP stream;
  determine a payload size of a packet in the first portion of the RTP stream; and
  calculate a bit rate for the RTP stream based, at least in part, upon the packet-time and the payload size.

12. The network monitoring system of claim 11, the program instructions further executable by the processor to cause the network monitoring system to:
  use the calculated bit rate as the first bit rate for the first portion of the RTP stream.

13. The network monitoring system of claim 11, the program instructions further executable by the processor to cause the network monitoring system to:
  select the first bit rate as being a bit rate value prescribed by the VBR codec that is closest to the calculated bit rate.

14. The network monitoring system of claim 13, wherein to select the first bit rate, the program instructions are further executable by the processor to cause the network monitoring system to:
  add or subtract a bit rate deviation value to or from the calculated bit rate.

15. The network monitoring system of claim 14, wherein the bit rate deviation value corresponds to a number of bits in a padded portion of the packet's payload.

16. The network monitoring system of claim 8, wherein to generate the average MOS, the program instructions are further executable by the processor to cause the network monitoring system to:
  calculate a packet payload size distribution corresponding to the first and second portions of the RTP stream; and
  calculate a weighted average of the first and second MOS using the packet payload size distribution.

17. A tangible electronic storage medium having program instructions stored thereon that, upon execution by a processor within a computer system, cause the computer system to:
  calculate a packet payload size distribution for an audio stream encoded with different bit rates;
  calculate Mean Opinion Scores (MOS) for each of two or more portions of the packet payload size distribution based, at least in part, upon the different bit rates; and
  determine an overall MOS for the audio stream based, at least in part, upon the calculated MOS and the packet payload size distribution.

18. The tangible electronic storage medium of claim 17, wherein the audio signal is transmitted in a Real-time Transport Protocol (RTP) stream over a Voice-over-IP (VoIP) network.

19. The tangible electronic storage medium of claim 17, wherein the audio signal is encoded using an Adaptive Multi-Rate (AMR) codec or an Enhanced Variable Rate codec (EVRC).

20. The tangible electronic storage medium of claim 17, wherein the program instructions, upon execution by the processor, further cause the computer system to:
  flag the audio stream in response to the overall MOS meeting a threshold value.

* * * * *